United States Patent
Obayashi

(10) Patent No.: US 6,561,296 B2
(45) Date of Patent: May 13, 2003

(54) ELECTRICAL-POWER GENERATING APPARATUS FOR AN AUTOMOTIVE VEHICLE WITH HYBRID DRIVE

(75) Inventor: Kazuyoshi Obayashi, Aichi-ken (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 09/960,371

(22) Filed: Sep. 24, 2001

(65) Prior Publication Data
US 2002/0038733 A1 Apr. 4, 2002

(30) Foreign Application Priority Data
Oct. 4, 2000 (JP) .................................. 2000-305384

(51) Int. Cl.$^7$ ................................................ B60K 6/00
(52) U.S. Cl. ................................ 180/65.2; 180/65.6
(58) Field of Search ........................ 180/65.3, 65.4, 180/65.7, 65.2, 65.6; 701/22, 53, 54

(56) References Cited

U.S. PATENT DOCUMENTS

| | | | | |
|---|---|---|---|---|
| 3,792,327 A | * | 2/1974 | Waldorf .................. | 318/139 |
| 3,837,419 A | * | 9/1974 | Nakamura ............... | 180/65.4 |
| 5,327,992 A | | 7/1994 | Boll ....................... | 290/1 R |
| 5,336,932 A | | 8/1994 | Barske .................... | 180/165.2 |
| 5,343,970 A | | 9/1994 | Severinsky .............. | 180/65.2 |
| 5,653,419 A | * | 8/1997 | Uchisawa et al. ....... | 251/58 |
| 5,713,814 A | * | 2/1998 | Hara et al. .............. | 477/5 |
| 5,789,881 A | * | 8/1998 | Egami et al. ............ | 318/139 |
| 6,090,007 A | * | 7/2000 | Nakajima et al. ....... | 477/46 |
| 6,223,842 B1 | * | 5/2001 | Masaki ................... | 180/65.2 |
| 6,301,529 B1 | * | 10/2001 | Itoyama et al. ......... | 701/22 |
| 6,315,068 B1 | * | 11/2001 | Hoshiya et al. ........ | 180/65.2 |

FOREIGN PATENT DOCUMENTS

| | | |
|---|---|---|
| JP | A-6-48222 | 2/1994 |
| JP | A-6-505619 | 6/1994 |

* cited by examiner

Primary Examiner—Paul N. Dickson
Assistant Examiner—Laura B Rosenberg
(74) Attorney, Agent, or Firm—Posz & Bethards, PLC

(57) ABSTRACT

An electric-power generating apparatus is designed for an automotive vehicle with a hybrid drive including a prime mover. The apparatus includes an electric device which operates as either a generator or a motor. The electric device is connected with the prime mover for transmitting and receiving torque thereto and therefrom. A control unit operates for, in cases where the electric device is required to operate as the generator, alternately setting a power-generation execution term and a power-generation suspension term and thereby controlling the electric device to intermittently operate as the generator so as to substantially equalize a mean quantity of actual power generation to a required power generation quantity. During the power-generation execution term, the electric device operates as the generator and provides a power generation quantity greater than the mean quantity. During the power-generation suspension term, operation of the electric device as the generator is suspended.

13 Claims, 8 Drawing Sheets

ELECTRICAL-POWER GENERATING APPARATUS FOR AN AUTOMOTIVE VEHICLE WITH HYBRID DRIVE

BACKGROUND OF THE INVENTION

1. Field of the Invention

This invention relates to an electric-power generating apparatus for an automotive vehicle with a hybrid drive.

2. Description of the Related Art

A typical automotive vehicle with a hybrid drive includes an electric generator/motor which can be operated in either a generator mode or a motor mode. It is known to control the generation of power by the generator/motor in response to the amount of electric power remaining in a vehicle battery or the state of charge of the vehicle battery. This control reduces the power generation efficiency when power is generated at a small rate. The reduction in the power generation efficiency causes a decrease in fuel economy regarding a vehicle engine. The reduction in the power generation efficiency results from core loss (iron loss) substantially uniquely determined by the rotational speed of the shaft of the generator/motor independent of the power generating torque.

U.S. Pat. No. 5,327,992 corresponding to Japanese patent application publication number 6-48222 discloses a method for controlling a hybrid drive consisting of an internal combustion engine and at least one electric motor which can be driven via an electrical energy source. The electric motor can be operated as a generator when required. In order to reduce the fuel consumption and the emission of noxious substances of the internal combustion engine in those operating ranges in which the torque to be output by the internal combustion engine to overcome the instantaneous tractive resistances lies below a torque corresponding to ideal operation of the internal combustion engine with respect to efficiency and/or exhaust gas behavior, the internal combustion engine is operated essentially with the torque corresponding to ideal operation. The differential torque between the torque corresponding to ideal operation and the torque to be output by the internal combustion engine to overcome the instantaneous tractive resistances is used to drive the electric motor which is switched as a generator. The amount of torque taken up by the electric motor operating as a generator is controlled to a set value corresponding to the differential torque.

U.S. Pat. No. 5,336,932 corresponding to Japanese patent application publication number 6-505619 discloses a method for controlling a generator associated with an internal combustion engine of a motor vehicle such that the generator is connected to provide electricity only under specific operating conditions. The method includes the following steps: (1) inputting engine consumption characteristic map values for various engine operating parameters to a logic module; (2) determining an operating point of the engine as defined by the operating map; (3) determining whether or not the operating point is less than or equal to a predetermined value; (4) connecting the generator to a load circuit associated with the motor vehicle if the operating point is at or falls below the predetermined value; and (5) disconnecting the generator from the load circuit if the operating point is greater than the predetermined value.

SUMMARY OF THE INVENTION

It is an object of this invention to provide an electric-power generating apparatus for an automotive vehicle with a hybrid drive which has a high power generation efficiency.

A first aspect of this invention provides an electric-power generating apparatus for an automotive vehicle with a hybrid drive including a prime mover. The apparatus comprises an electric device operating as either a generator or a motor, and being connected with the prime mover for transmitting and receiving torque to and from the prime mover; means for determining a required power generation quantity; and a control unit for, in cases where the electric device is required to operate as the generator, alternately setting a power-generation execution term and a power-generation suspension term and thereby controlling the electric device to intermittently operate as the generator so as to substantially equalize a mean quantity of actual power generation by the electric device to the required power generation quantity, wherein during the power-generation execution term, the electric device operates as the generator and provides a power generation quantity greater than the mean quantity, and during the power-generation suspension term, operation of the electric device as the generator is suspended.

A second aspect of this invention is based on the first aspect thereof, and provides an electric-power generating apparatus wherein the control unit comprises means for setting the electric device to a highly efficient state during the power-generation execution term, and means for adjusting a ratio between the power-generation execution term and the power-generation suspension term so as to substantially equalize the mean quantity of actual power generation to the required power generation quantity.

A third aspect of this invention is based on the first aspect thereof, and provides an electric-power generating apparatus wherein a sum of the power-generation execution term and the power-generation suspension term is equal to 1 second or shorter.

A fourth aspect of this invention is based on the first aspect thereof, and provides an electric-power generating apparatus wherein the control unit comprises means for changing a torque of the prime mover in response to which of the power-generation execution term and the power-generation suspension term is currently set.

A fifth aspect of this invention is based on the first aspect thereof, and provides an electric-power generating apparatus further comprising means for gradually varying a command torque of the electric device.

A sixth aspect of this invention is based on the first aspect thereof, and provides an electric-power generating apparatus wherein the prime mover and the electric device are connected via a transmission to vehicle wheels, and the electric device is connected with a battery, and wherein the control unit comprises means for detecting a required charge quantity of the battery and setting the detected required charge quantity as the required power generation quantity, and means for changing a gear ratio in the transmission in response to the required power generation quantity.

A seventh aspect of this invention is based on the first aspect thereof, and provides an electric-power generating apparatus further comprising means for detecting a rotation speed of the prime mover, means for determining whether or not the detected rotational speed of the prime mover is lower than a prescribed reference speed, and means for nullifying the power-generation suspension term to continuously set the power-generation execution term in cases where it is determined that the detected rotational speed of the prime mover is lower than the prescribed reference speed.

An eighth aspect of this invention is based on the first aspect thereof, and provides an electric-power generating apparatus wherein the control unit comprises means for, in cases where the electric device is required to operate as the motor, alternately setting a motor activation term and a motor deactivation term and thereby controlling the electric device to intermittently operate as the motor, wherein during the motor activation term, the electric device operates as the generator, and during the motor deactivation term, operation of the electric device as the motor is suspended.

A ninth aspect of this invention provides an electric-power generating apparatus for an automotive vehicle with a hybrid drive including a prime mover. The apparatus comprises an electric device operating as either a generator or a motor, and being connected with the prime mover for transmitting and receiving torque to and from the prime mover; first means for determining whether or not the electric device is required to operate as the generator; and second means for controlling the electric device to intermittently operate as the generator in cases where the first means determines that the electric device is required to operate as the generator.

A tenth aspect of this invention provides an electric-power generating apparatus for an automotive vehicle with a hybrid drive including a prime mover. The apparatus comprises an electric device operating as either a generator or a motor, and being connected with the prime mover for transmitting and receiving torque to and from the prime mover; first means for determining whether or not the electric device is required to operate as the motor; and second means for controlling the electric device to intermittently operate as the motor in cases where the first means determines that the electric device is required to operate as the motor.

An eleventh aspect of this invention provides an electric-power generating apparatus for an automotive vehicle with a hybrid drive including a prime mover. The apparatus comprises an electric device operating as either a generator or a motor, and being connected with the prime mover for transmitting and receiving torque to and from the prime mover; first means for determining a required power generation rate; second means for determining whether or not the electric device is required to operate as the generator; and third means for controlling the electric device to intermittently operate as the generator so as to substantially equalize a mean rate of actual power generation by the electric device to the required power generation rate in cases where the second means determines that the electric device is required to operate as the generator.

A twelfth aspect of this invention is based on the first aspect thereof, and provides an electric-power generating apparatus further comprising means for detecting a rotation speed of the prime mover, means for calculating a maximum power generation quantity from the detected rotational speed of the prime mover, means for determining whether or not the required power generation quantity is greater than the maximum power generation quantity, and means for, in cases where it is determined that the required power generation quantity is greater than the maximum power generation quantity, correcting and equalizing the required power generation quantity to the maximum power generation quantity.

A thirteenth aspect of this invention is based on the first aspect thereof, and provides an electric-power generating apparatus further comprising means for detecting a rotation speed of the prime mover, means for deciding a prime-mover torque up quantity in response to the required power generation quantity, means for determining whether or not the prime-mover torque up quantity can be provided at a current value of the detected rotational speed of the prime mover, and means for, in cases where it is determined that the prime-mover torque up quantity can not be provided, updating the required power generation quantity in response to the prime-mover torque up quantity and the current value of the detected rotational speed of the prime mover.

A fourteenth aspect of this invention is based on the first aspect thereof, and provides an electric-power generating apparatus further comprising means for, in cases where the electric device is operating as the generator, comparing a generator mean torque command value and a highly efficient operation point torque of the generator to select the greater of the generator mean torque command value and the highly efficient operation point torque of the generator, and means for controlling the generator in response to the greater of the generator mean torque command value and the highly efficient operation point torque of the generator.

DETAILED DESCRIPTION OF THE INVENTION

First Embodiment

Figure 1:
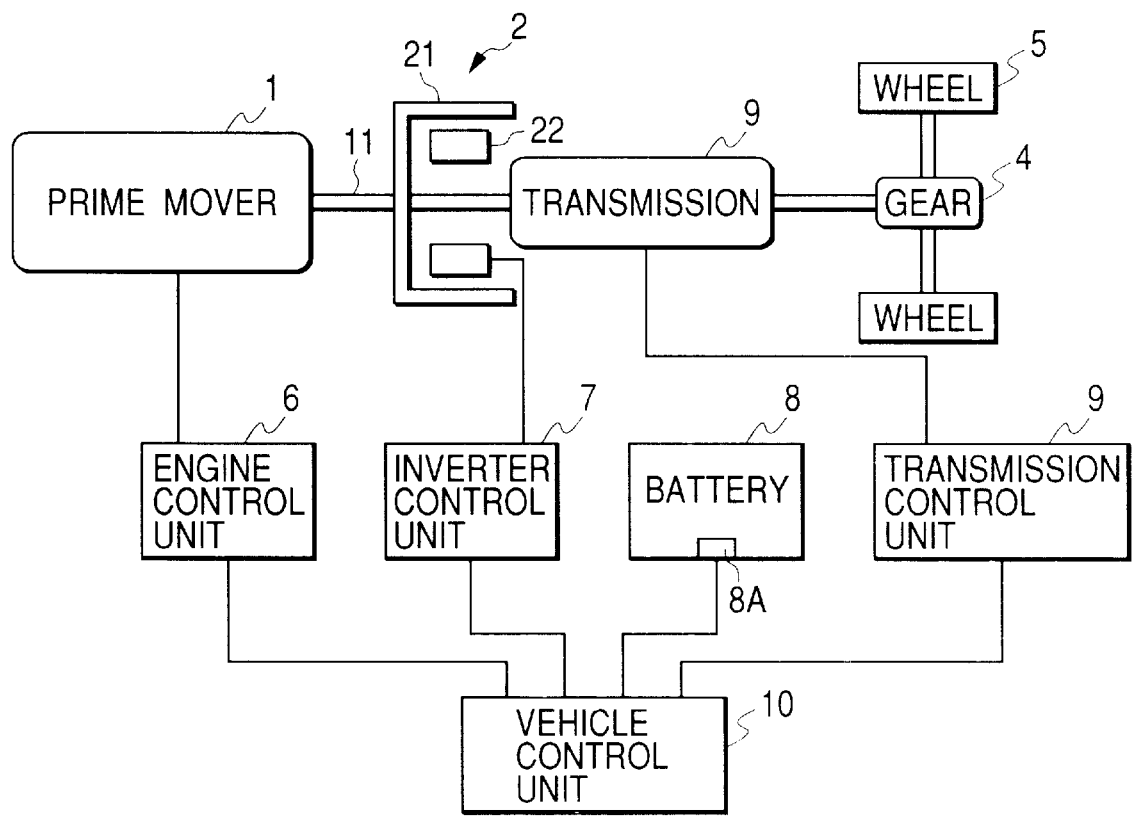
FIG. 1 is a diagram of a hybrid drive of an automotive vehicle which includes an electric-power generating apparatus according to a first embodiment of this invention.

FIG. 1 shows a hybrid drive of a n automotive vehicle which includes an electric-power generating apparatus according to a first embodiment of this invention.

With reference to FIG. 1, a prime mover (a prime bar) 1 consists of an internal combustion engine. An electric generator/motor 2 is of a three-phase synchronous type. The generator/motor 2 can be operated as either a generator or a motor. In other words, the generator/motor 2 can be operated in either a generator mode or a motor mode. Furthermore, the power generation by the generator/motor 2 can be selectively executed and suspended. The prime mover 1 has an output shaft 11 mechanically coupled with a rotor 21 of the generator/motor 2. The rotor 21 has a portion extending radially outward of a stator 22 in the generator/motor 2. The portion of the rotor 21 opposes the stator 22. The rotor 21 is connected to vehicle wheels 5 via a transmission 3 and a differential gear 4. Also, the output shaft 11 of the prime mover 1 is connected to the vehicle wheels 5 via the transmission 3 and the differential gear 4. The transmission 3 includes a clutch for coupling and uncoupling the output shaft 11 of the prime mover 1 (a transmission input shaft) to and from a subsequent drive shaft (a transmission output shaft) connected to the differential gear 4.

An engine control unit 6 acts to control the prime mover 1. The engine control unit 6 can adjust the position of a throttle valve in the prime mover 1, the fuel injection rate in the prime mover 1, and the number of active cylinders (or the number of inactive cylinders) in the prime mover 1 to control an actual torque outputted therefrom. An inverter control unit 7 acts to control an inverter (not shown) for transmitting electric power between a battery 8 and the stator 22 of the generator/motor 2. Also, the inverter control unit 7 acts to control the generator/motor 2. The inverter control unit 7 can selectively execute and suspend the power generation by the generator/motor 2. Furthermore, the inverter control unit 7 can adjust the rate of transmission of electric power between the battery 8 and the generator/motor 2 to control an actual torque of the generator/motor 2. The inverter control unit 7 may receive, from a sensor associated with the generator/motor 2, information representing the rotational speed of the shaft or the rotor 21 of the generator/motor 2. A transmission control unit 9 acts to control the gear position of the transmission 3. Also, the transmission control unit 9 acts to control the clutch in the transmission 3.

A vehicle control unit 10 is electrically connected with the engine control unit 6, the inverter control unit 7, and the transmission control unit 9. The vehicle control unit 10 receives information from the engine control unit 6 which represents operating conditions of the prime mover 1. The operating conditions of the prime mover 1 include the rotational speed of the output shaft 11 of the prime mover 1, the position of an accelerator associated with the prime mover 1, the speed of the automotive vehicle, the position of the throttle valve in the prime mover 1, the fuel injection rate in the prime mover 1, and the number of active cylinders in the prime mover 1. The vehicle control unit 10 receives information from the inverter control unit 7 which represents operating conditions of the inverter and also operating conditions of the generator/motor 2. The operating conditions of the generator/motor 2 include the rotational speed of the shaft or the rotor 21 thereof. The vehicle control unit 10 receives information from the transmission control unit 9 which represents operating conditions of the transmission 3. The operating conditions of the transmission 3 include the gear position thereof and the gear ratio therein. The engine control unit 6, the inverter control unit 7, and the transmission control unit 9 can respond to signals outputted from the vehicle control unit 10. Accordingly, the vehicle control unit 10 can control the prime mover 1 via the engine control unit 6. The vehicle control unit 10 can control the inverter via the inverter control unit 7. In addition, the vehicle control unit 10 can selectively execute and suspend the power generation by the generator/motor 2 through the inverter control unit 7. The vehicle control unit 10 can control the gear position of the transmission 3 via the transmission control unit 9. Also, the vehicle control unit 10 can control the clutch in the transmission 3 via the transmission control unit 9.

The vehicle control unit 10 is electrically connected to a sensor 8A associated with the battery 8. The vehicle control unit 10 receives information from the sensor 8A which represents the charge state of the battery 8.

It should be noted that a second rotational electric device may be provided which is mechanically coupled with the input shaft or the output shaft of the transmission 3 to perform torque transmission with the vehicle wheels on, for example, a torque assist basis.

The vehicle control unit 10 includes a microcomputer, a microprocessor, or a similar device which has a combination of an input/output port, a processing section, a ROM, and a RAM. The vehicle control unit 10 operates in accordance with a program stored in the ROM. The program has a main routine and subroutines.

Figure 2:
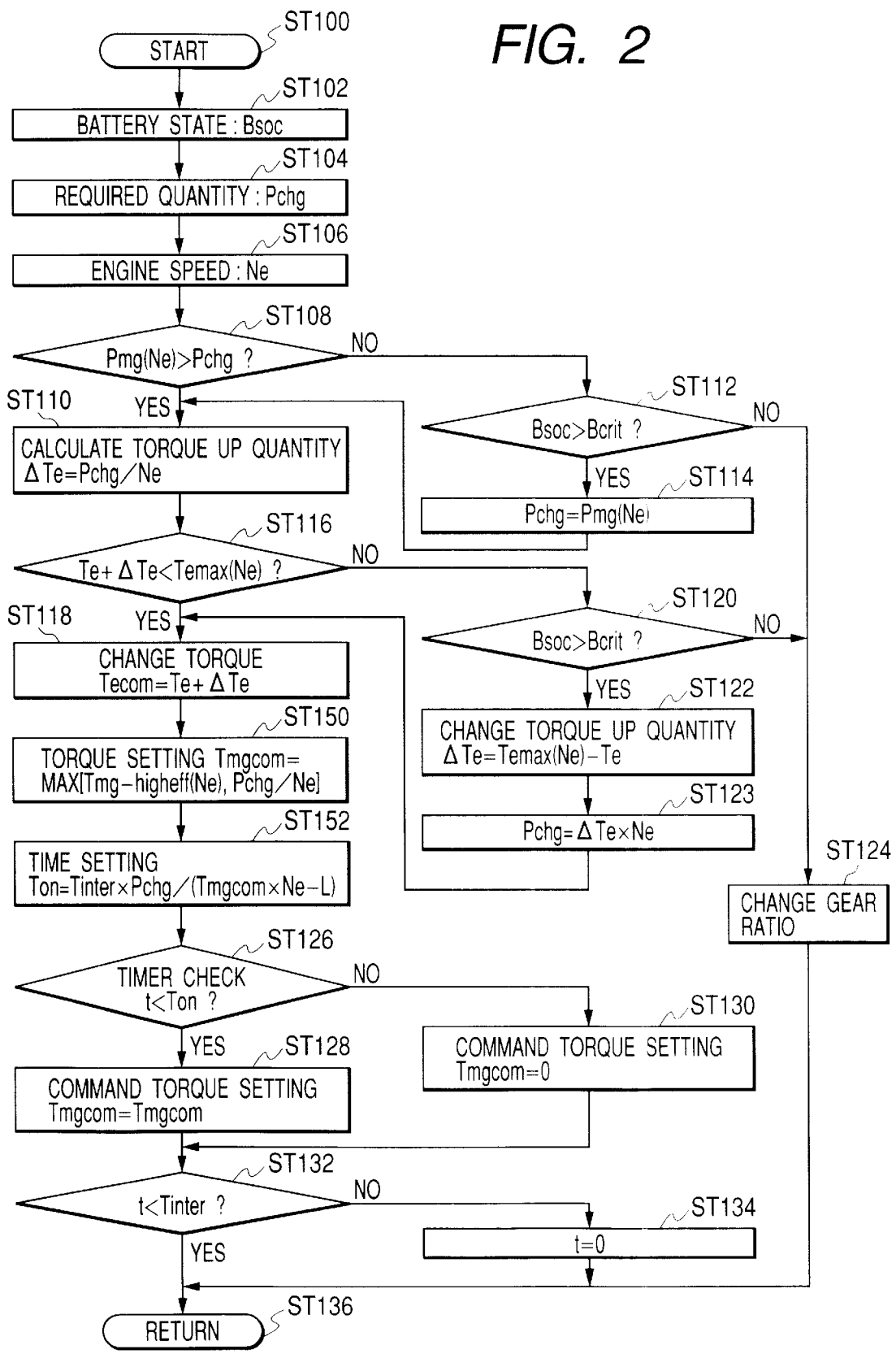
FIG. 2 is a flowchart of a segment of a program for a vehicle control unit in FIG. 1.

FIG. 2 is a flowchart of a segment (a subroutine) of the program for the vehicle control unit 10. The program segment in FIG. 2 relates to the operation of the generator/motor 2 in the generator mode. The program segment in FIG. 2 is repetitively executed.

With reference to FIG. 2, a starting step ST100 of the program segment resets or initializes specified variables and flags used during the execution of the program segment.

A step ST102 following the step ST100 detects the present battery state Bsoc, that is, the present state of charge of the battery 8 or the present amount of electric power remaining in the battery 8, by referring to the information fed from the sensor 8A associated with the battery 8.

A step ST104 subsequent to the step ST102 calculates a required charge quantity or rate (a required power generation quantity or rate) Pchg from the present battery charge state Bsoc according to a table look-up procedure or a predetermined function.

A step ST106 following the step ST104 derives the present engine speed Ne, that is, the present rotational speed (the present angular speed) of the output shaft 11 of the prime mover 1, from the information given by the engine control unit 6.

A step ST108 subsequent to the step ST106 calculates the power generation capability Pmg(Ne), that is, the level of power which can be generated by the generator/motor 2, from the present engine speed Ne according to a table look-up procedure or a predetermined function. The step ST108 determines whether or not the power generation capability Pmg(Ne) corresponds to more than the required charge quantity (the required power generation quantity or rate) Pchg. When the power generation capability Pmg(Ne) corresponds to more than the required charge quantity Pchg, the program advances from the step ST108 to a step ST110. On the other hand, when the power generation capability Pmg(Ne) corresponds to the required charge quantity Pchg or less, the program advances from the step ST108 to a step ST112.

The step ST110 calculates an engine torque up quantity $\Delta Te$ from the required charge quantity Pchg and the present engine speed Ne according to an equation as follows.

$$\Delta Te = Pchg/Ne$$

Thus, the engine torque up quantity $\Delta Te$ is equal to the required charge quantity Pchg divided by the present engine speed Ne. The engine torque up quantity $\Delta Te$ indicates an estimated increase in the torque output from the prime mover 1 which responds to power generation at a rate corresponding to the required charge quantity Pchg.

The step ST112 determines whether or not the present battery charge state Bsoc corresponds to greater than a prescribed value Bcrit. When the present battery charge state Bsoc corresponds to greater than the prescribed value Bcrit, the program advances from the step ST112 to a step ST114. On the other hand, when the present battery charge state Bsoc corresponds to the prescribed value Bcrit or less, the program advances from the step ST112 to a step ST124.

The step ST114 sets the value of the required charge quantity (the required power generation quantity) Pchg to the value of the power generation capability Pmg(Ne). In other words, the step ST114 limits the required charge quantity (the required power generation quantity) Pchg in accordance with the power generation capability Pmg(Ne). After the step ST114, the program advances to the step ST100.

The step ST124 controls the transmission 3 via the transmission control unit 9. Specifically, the step ST124 shifts down the gear position of the transmission 3 to increase the gear ratio and the maximum power generation amount. After the step ST124, the program advances to an ending step ST136 at which the current execution cycle of the program segment ends. Then, the program returns to the main routine.

A step ST116 derives or estimates the present engine output torque Te, that is, the present torque output of the prime mover 1, from the information given by the engine control unit 6 and the information given by the transmission control unit 9. The derivation or estimation of the present engine output torque Te uses a table look-up procedure responsive to, for example, the throttle position, the engine speed, and the gear ratio represented by the information from the engine control unit 6 and the information from the transmission control unit 9. The step ST116 adds the present engine output torque Te and the engine torque up quantity $\Delta Te$ into an addition-result engine torque Te+$\Delta Te$. The step ST116 calculates a maximum engine output torque Temax (Ne) from the present engine speed Ne according to a table look-up procedure or a predetermined function. The step ST116 determines whether or not the addition-result engine torque Te+$\Delta Te$ is smaller than the maximum engine output torque Temax(Ne). When the addition-result engine torque Te+$\Delta Te$ is smaller than the maximum engine output torque Temax(Ne), the program advances from the step ST116 to a step ST118. On the other hand, when the addition result engine torque Te+$\Delta Te$ is equal to or greater than the maximum engine output torque Temax(Ne), the program advances from the step ST116 to a step ST120.

The step ST118 sets a command engine output torque Tecom to the addition-result engine torque Te+$\Delta Te$. According to an engine control subroutine of the program, the prime mover 1 is controlled so as to substantially equalize an actual output torque thereof to the command engine output torque Tecom.

The step ST120 determines whether or not the present battery charge state Bsoc corresponds to greater than the prescribed value Bcrit. When the present battery charge state Bsoc corresponds to greater than the prescribed value Bcrit, the program advances from the step ST120 to a step ST122. On the other hand, when the present battery charge state Bsoc corresponds to the prescribed value Bcrit or less, the program advances from the step ST120 to the step ST124 which shifts down the gear position of the transmission 3. The step ST124 is followed by the ending step ST136.

The step ST122 updates or changes the engine torque up quantity $\Delta Te$. Specifically, the step ST122 sets the engine torque up quantity $\Delta Te$ to a value equal to the maximum engine output torque Temax(Ne) minus the present engine output torque Te. The step ST122 functions to limit the command engine output torque Tecom to the maximum engine output torque Temax(Ne).

A step ST123 subsequent to the step ST122 sets the value of the required charge quantity (the required power generation quantity) Pchg to the product of the engine torque up quantity $\Delta Te$ and the present engine speed Ne. Thus, the step ST123 updates the required charge quantity (the required power generation quantity) Pchg according to the equation as "Pchg=$\Delta Te \cdot Nc$". After the step ST123, the program advances to the step ST118.

A step ST150 following the step ST118 calculates a highest-efficiency torque Tmg_higheff(Ne) of the generator/motor 2 from the present engine speed Ne according to a table look-up procedure or a predetermined function. The highest-efficiency torque Tmg_higheff(Ne) corresponds to a value at which the efficiency of the generator/motor 2 is maximized. The step ST150 divides the required charge quantity (the required power generation quantity) Pchg by the present engine speed Ne to generate the division result Pchg/Ne. The step ST150 sets a command torque Tmgcom of the generator/motor 2 to the greater, in absolute value, of the highest-efficiency torque Tmg_higheff(Ne) and the division result Pchg/Ne according to the equation as follows.

$$Tmgcom=MAX[Tmg\_higheff(Ne), Pchg/Ne]$$

where "MAX" denotes an operator of selecting one among the two in the brackets which has a greater absolute value.

A step ST152 subsequent to the step ST150 calculates a power-generation execution term Ton from a predetermined PWM (pulse-width modulation) period Tinter, the required charge quantity (the required power generation quantity or rate) Pchg, the command torque Tmgcom of the generator/motor 2, the present engine speed Ne, and a loss L according to an equation as follows.

$$Ton=Tinter \cdot Pchg/(Tmgcom \cdot Ne-L)$$

The power-generation execution term Ton means a time interval during which the power generation by the generator/motor 2 remains executed, that is, a time interval during which the generator/motor 2 continues to be operated in the generator mode. There is a power-generation suspension term Toff during which the power generation by the generator/motor 2 remains suspended. In general, the power-generation execution term Ton and the power-generation suspension term Toff alternate with each other. The predetermined PWM period Tinter is composed of a pair of the power-generation execution term Ton and the power-generation suspension term Toff. The ratio of the power-generation execution time Ton to the predetermined PWM period Tinter is equal to the duty cycle or the duty ratio. Preferably, the predetermined PWM period Tinter is equal to 1 second or shorter. In this case, a vehicle occupant is usually insensitive to a variation or fluctuation in the actual torque of the generator/motor 2. The loss L is caused in the power feed to the battery 8 from the generator/motor 2 and the charging of the battery 8 by the generator/motor 2.

A step ST126 following the step ST152 refers to a power-generation timer (a variable). According to a timer control subroutine of the program, the power-generation timer is started when the power generation is commenced. The power-generation timer measures the time interval "t" during which the power generation continues, that is, the time elapsed since the moment of the commencement of the power generation. The step ST126 determines whether or not the measured time interval "t" reaches the power-generation execution term Ton. When the measured time interval "t" does not reach the power-generation execution term Ton, the program advances from the step ST126 to a step ST128. On the other hand, when the measured time interval "t" reaches the power-generation execution term Ton, the program advances from the step ST126 to a step ST130.

The step ST128 holds the command torque Tmgcom of the generator/motor 2 unchanged. Specifically, the step ST128 executes the program statement "Tmgcom= Tmgcom". According to a generator/motor control subroutine of the program, the power generation by the generator/motor 2 is implemented and controlled so as to substantially equalize an actual torque thereof to the command torque Tmgcom. After the step ST128, the program advances to a step ST132.

The step ST130 resets the command torque Tmgcom of the generator/motor 2 to "0". Specifically, the step ST130 executes the program statement "Tmgcom=0". According to the generator/motor control subroutine of the program, the power generation by the generator/motor 2 is suspended in response to the command torque Tmgcom being "0". As a result, the power-generation execution term Ton is replaced by the power-generation suspension term Toff. After the step ST130, the program advances to the step ST132.

The step ST132 determines whether or not the measured time interval "t" reaches the predetermined PWM period Tinter. When the measured time interval "t" reaches the predetermined PWM period Tinter, the program advances from the step ST132 to a step ST134. On the other hand, when the measured time interval "t" does not reach the predetermined PWM period Tinter, the program advances from the step ST132 to the ending step ST136. In this case, the current execution cycle of the program segment ends, and then the program returns to the main routine.

The step ST134 resets the power-generation timer, and thereby initializes the measured time interval "t" to "0". After the step ST134, the program advances to the ending step ST136 at which the current execution cycle of the program segment ends. Then, the program returns to the main routine.

Under given conditions, the program segment in FIG. 2 commands the generator/motor 2 to intermittently execute the power generation at the predetermined PWM period Tinter and the duty cycle (the duty ratio) determined by the length of the power-generation execution term Ton. As a result, the generator/motor 2 actually implements the intermittent power generation. The power-generation execution term Ton or the duty cycle is set so as to substantially equalize a mean quantity or rate of actual power generation by the generator/motor 2 to the required power generation quantity or rate Pchg.

The loss L in the power feed to the battery 8 from the generator/motor 2 and the charging of the battery 8 by the generator/motor 2 may be taken into account by multiplying the power generation efficiency at the operation point of the generator/motor 2 by the power feed and charging efficiencies.

The command torque Tmgcom of the generator/motor 2 may be subjected to a low pass filtering process. In this case, the command torque Tmgcom of the generator/motor 2 is processed by, for example, a low pass filter. The filtering-resultant command torque more gradually varies. Accordingly, it is possible to prevent the occurrence of a deterioration in a drive feeling which might be caused by a stepwise change of the command torque Tmgcom.

Figure 3:
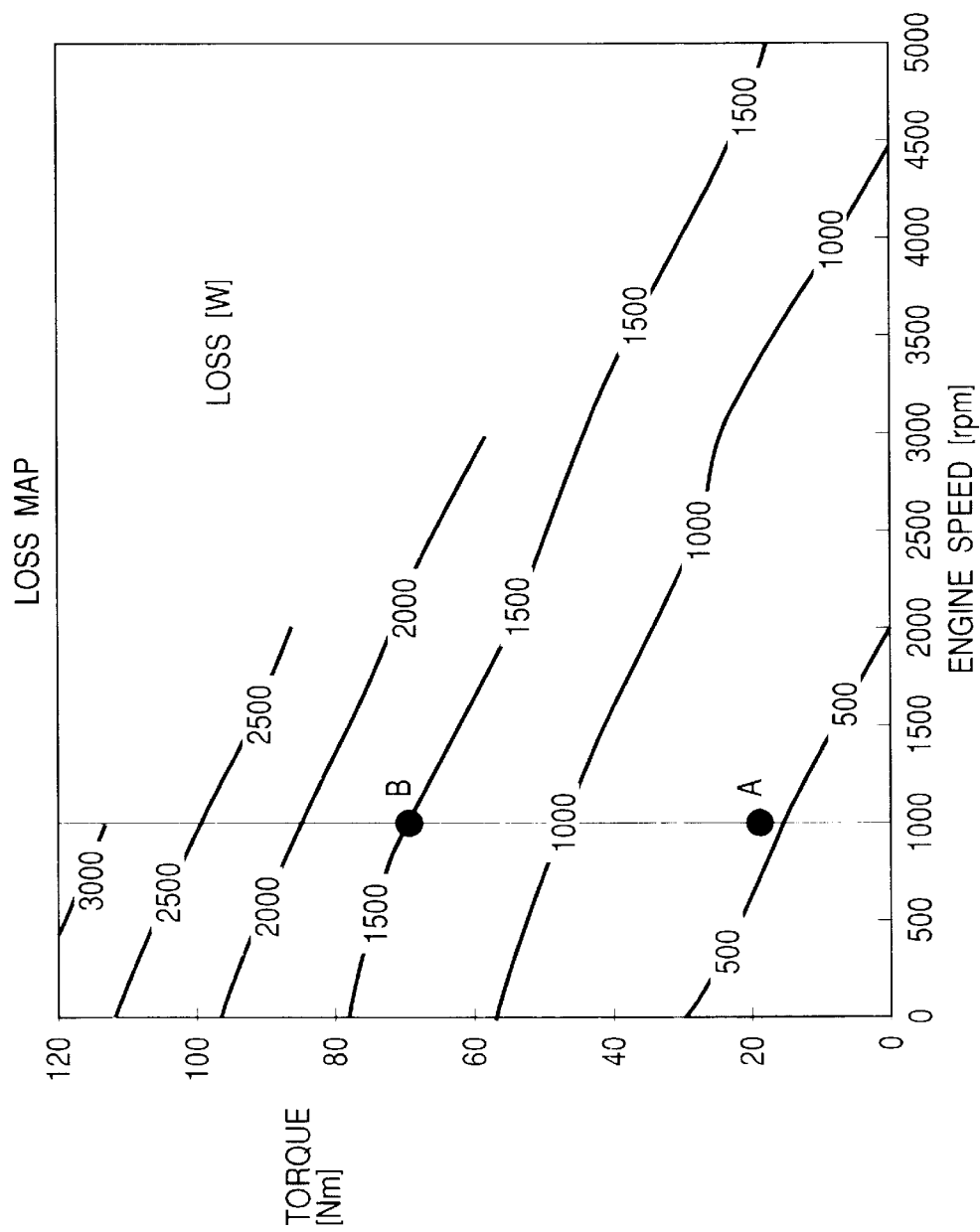
FIG. 3 is a loss-map diagram of the relation among a power loss in an electric generator/motor, a torque of the generator/motor, and an engine speed.

With reference to FIG. 3, in the case where the required power generation quantity is equal to 200 W and the engine speed Ne is equal to 1,000 rpm, the generator/motor 2 executes the intermittent power generation at the highest efficiency point "B" (70 Nm in torque). The power generation loss corresponding to the highest efficiency point "B" is equal to 1,500 W. The duty ratio related to the intermittent power generation is equal to 2/7. Therefore, it is possible to reduce a mean power generation loss (an effective power generation loss). Specifically, the mean power generation loss corresponding to the highest efficiency point "B" is equal to 430 W (=1500 W·2/7). On the other hand, in a prior-art apparatus, an electric generator/motor executes continuous power generation at an operation point "A" (20 Nm in torque). The power generation loss corresponding to the operation point "A" is equal to 550 W which is greater than 430 W by 120 W.

Figure 4:
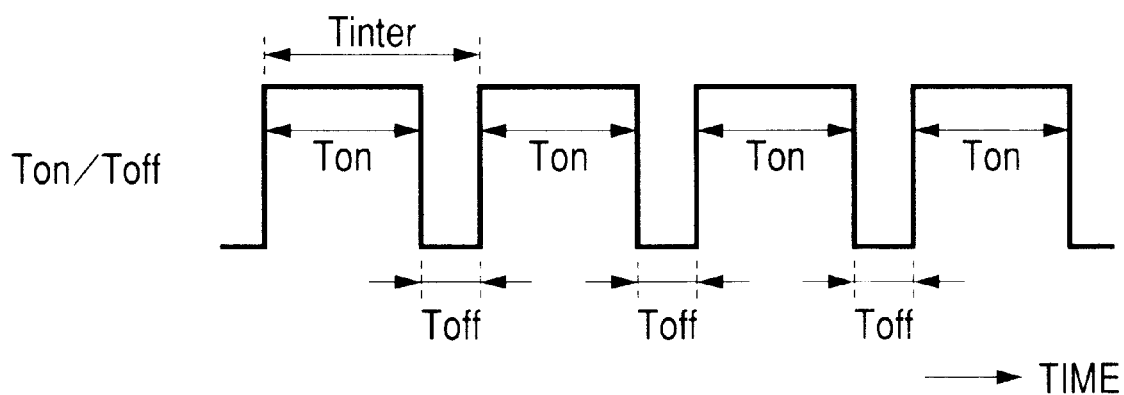
FIG. 4 is a time-domain diagram of a first example of alternation between a power-generation execution term and a power-generation suspension term.
Figure 5:
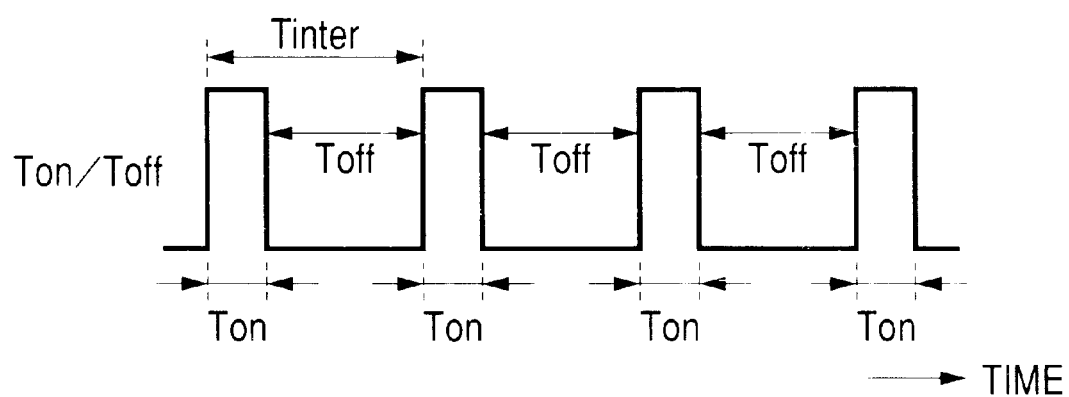
FIG. 5 is a time-domain diagram of a second example of alternation between the power-generation execution term and the power-generation suspension term.

As shown in FIGS. 4 and 5, the power-generation execution term Ton and the power-generation suspension term Toff alternate with each other. The predetermined PWM period Tinter is composed of a pair of the power-generation execution term Ton and the power-generation suspension term Toff. The ratio of the power-generation execution term Ton to the predetermined PWM period Tinter, that is, the duty ratio (the duty cycle), is variable in accordance with the Ton setting by the step ST152 (see FIG. 2). In FIG. 4, the duty ratio is relatively great. In FIG. 5, the duty ratio is relatively small.

Second Embodiment

A second embodiment of this invention is similar to the first embodiment thereof except for design changes mentioned hereafter.

Figure 6:
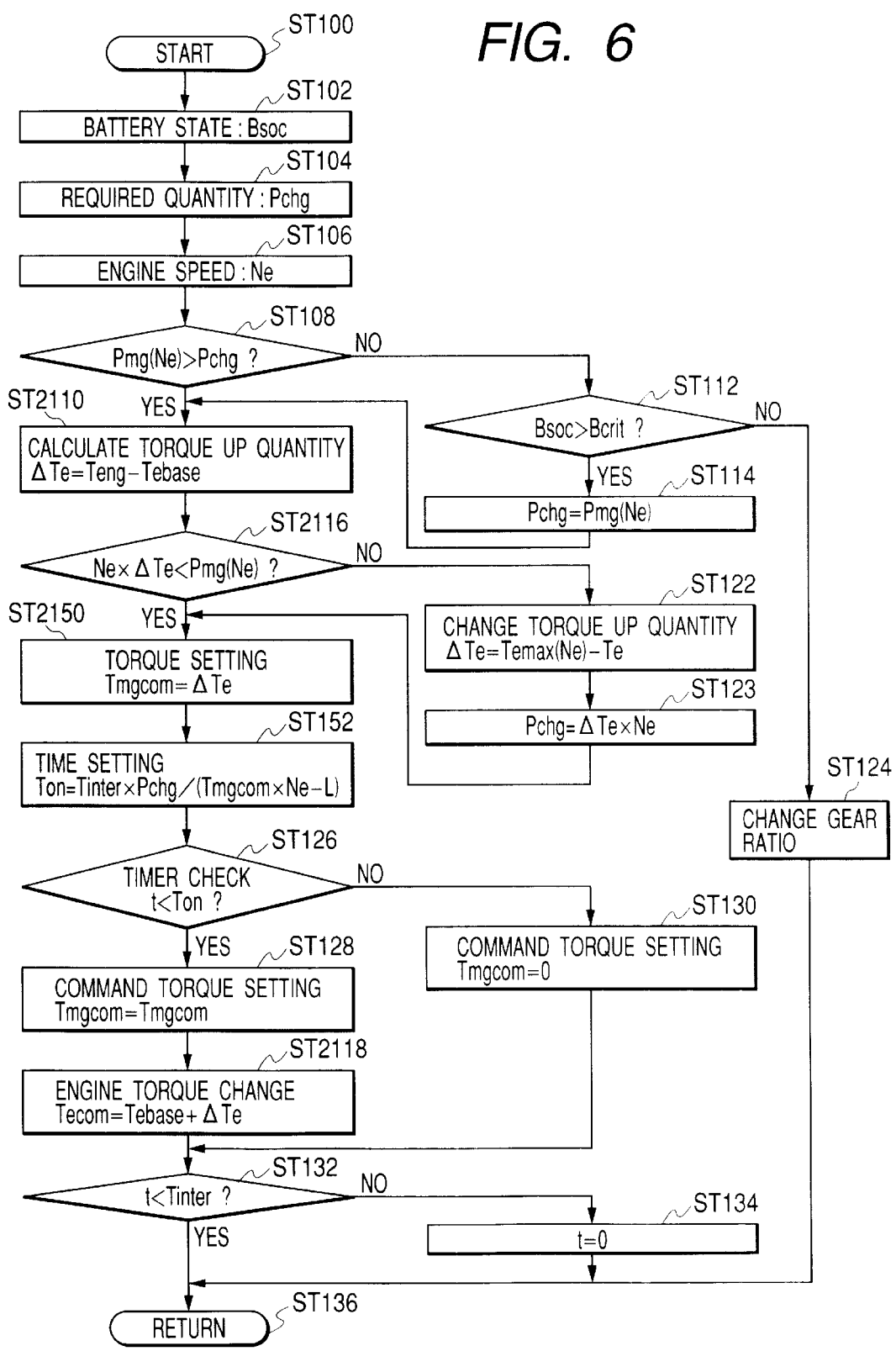
FIG. 6 is a flowchart of a segment of a program for a vehicle control unit in a second embodiment of this invention.

FIG. 6 is a flowchart of a segment of a program for a vehicle control unit 10 (see FIG. 1) in the second embodiment of this invention. The program segment in FIG. 6 is modified from the program segment in FIG. 2. The program segment in FIG. 6 includes steps ST2110, ST2116, ST2122, and ST2150 which replace the steps ST110, ST116, ST118, ST120, and ST122 in FIG. 2. The program segment in FIG. 6 includes a step ST2118 between the steps ST128 and ST132.

The step ST2110 follows the steps ST108 and ST114. The step ST2110 calculates the highest-efficiency engine torque Teng from the present engine speed Ne according to a table look-up procedure or a predetermined function. The engine torque Teng means the torque output of a prime mover 1 (see FIG. 1) which corresponds to the highest efficiency of the prime mover 1. The step ST2110 derives or estimates the present engine output torque Tebase, that is, the present torque output of the prime mover 1. The present engine output torque Tebase is exclusive of a torque to drive an electric generator/motor 2 (see FIG. 1). The present engine output torque Tebase is determined according to a table look-up procedure responsive to the accelerator position, the vehicle speed, and the gear ratio represented by the information fed from an engine control unit 6 (see FIG. 1) and the information fed from a transmission control unit 9 (see FIG. 1). The step ST2110 calculates an engine torque up quantity $\Delta Te$ from the highest-efficiency engine torque Teng and the present engine output torque Tebase according to an equation as follows.

$$\Delta Te = Teng - Tebase$$

Thus, the engine torque up quantity $\Delta Te$ is equal to the highest-efficiency engine torque Teng minus the present engine output torque Tebase. The engine torque up quantity $\Delta Te$ corresponds to a torque value which should be added or absorbed by the generator/motor 2.

The step ST2116 follows the step ST2110. The step ST2116 multiplies the engine torque up quantity $\Delta Te$ by the present engine speed Ne to get the multiplication result Ne·$\Delta Te$ corresponding to the engine output up quantity. The step ST2116 determines whether or not the engine output up quantity Ne·$\Delta Te$ is smaller than the power generation capability Pmg(Ne). When the engine output up quantity Ne·$\Delta Te$ is smaller than the power generation capability Pmg(Ne), the program advances from the step ST2116 to the step ST2150. On the other hand, when the engine output up quantity Ne·ΔTe is equal to or greater than the power generation capability Pmg(Ne), the program advances from the step ST2116 to the step ST2122.

The step ST2122 updates or changes the engine torque up quantity ΔTe. Specifically, the step ST2122 sets the engine torque up quantity ΔTe to a value equal to the power generation capability Pmg(Ne) divided by the present engine speed Ne. The step ST2122 executes the program statement "ΔTe=Pmg(Ne)/Ne". The step ST2122 is followed by the step ST123.

The step ST123 sets the value of the required charge quantity (the required power generation quantity) Pchg to the product of the engine torque up quantity ΔTe and the present engine speed Ne. Thus, the step ST123 updates the required charge quantity (the required power generation quantity) Pchg according to the equation as "Pchg=ΔTe·Ne". After the step ST123, the program advances to the step ST2150.

The step ST2150 sets a command torque Tmgcom of the generator/motor 2 to the engine torque up quantity ΔTe. After the step ST2150, the program advances to the step ST152.

The step ST2118 follows the step ST128. The step ST2118 adds the present engine output torque Tebase and the engine torque up quantity ΔTe into an addition-result engine torque Tebase+ΔTe. The step ST2118 sets a command engine output torque Tecom to the addition-result engine torque Tebase+ΔTe. According to an engine control subroutine of the program, the prime mover 1 is controlled so as to substantially equalize an actual output torque thereof to the command engine output torque Tecom. After the step ST2118, the program advances to the step ST132.

The program segment in FIG. 6 enables both the prime mover and the generator/motor 2 to operate at high efficiencies when the power generation by the generator/motor 2 is executed. In addition, during the execution of the power generation by the generator/motor 2, the command torque Tmgcom of the generator/motor 2 and the command torque Tecom of the prime mover 1 are varied by the same value ΔTe at substantially the same timing so that the torque on the output shaft 11 of the prime mover 1 remains substantially constant. Accordingly, a torque variation or fluctuation hardly occurs. Thus, it is possible to prevent the occurrence of a deterioration in a drive feeling which might be caused by a torque variation or fluctuation.

Third Embodiment

A third embodiment of this invention is similar to the first embodiment thereof except for design changes mentioned hereafter.

Figure 7:
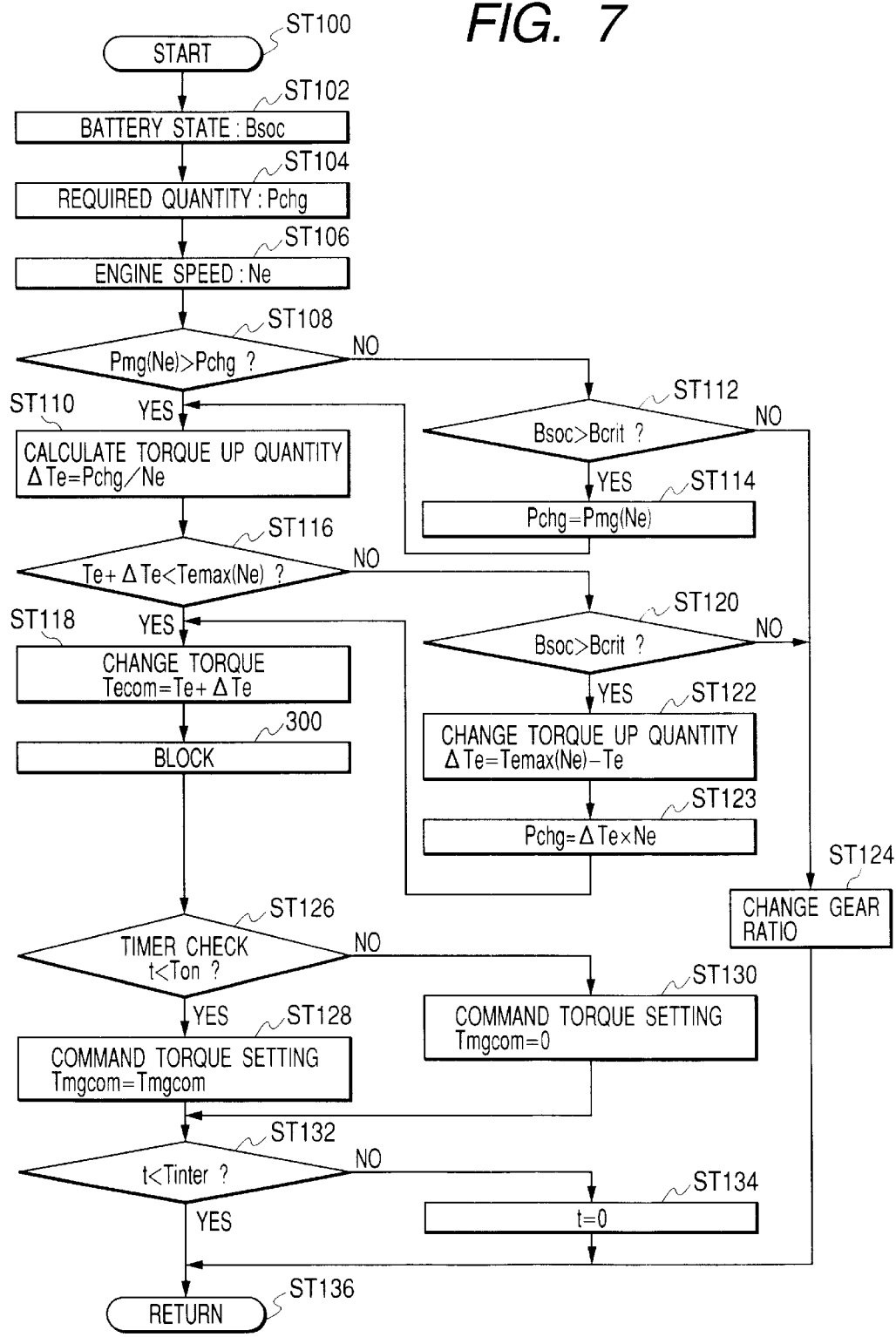
FIG. 7 is a flowchart of a segment of a program for a vehicle control unit in a third embodiment of this invention.
Figure 8:
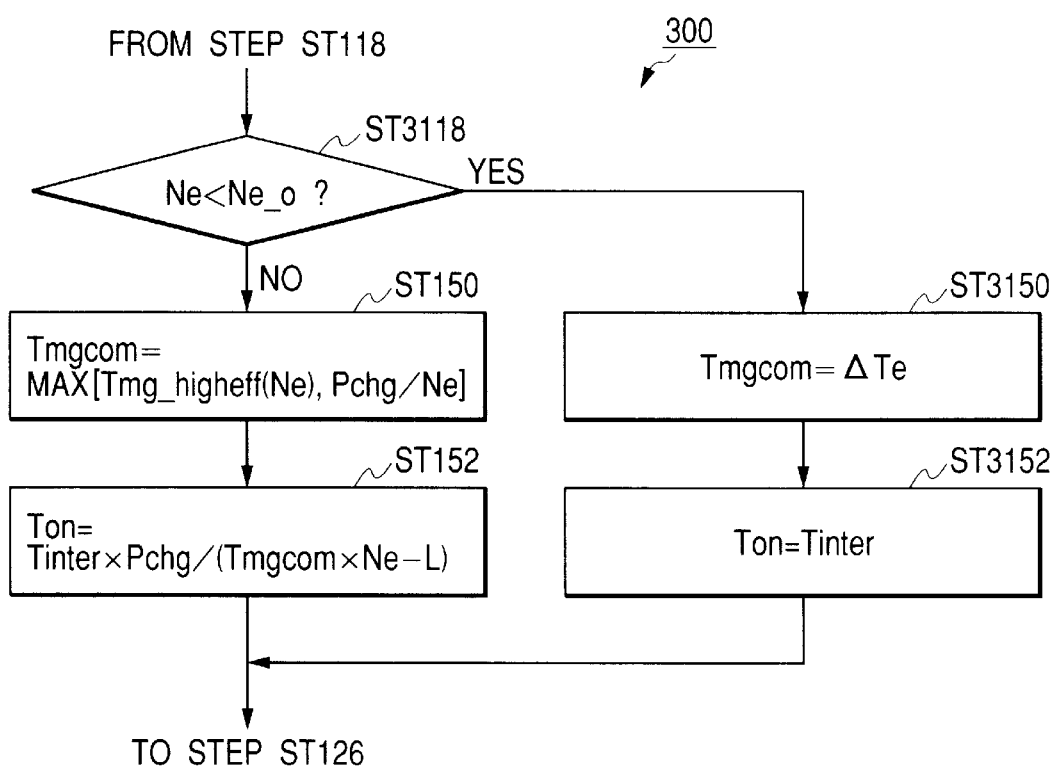
FIG. 8 is a flowchart of a block in FIG. 7.

FIG. 7 is a flowchart of a segment of a program for a vehicle control unit 10 (see FIG. 1) in the third embodiment of this invention. The program segment in FIG. 7 is modified from the program segment in FIG. 2. The program segment in FIG. 7 includes a block 300 between the steps ST118 and ST126. As shown in FIG. 8, the block 300 includes steps ST3118, ST3150, and ST3152 in addition to the steps ST150 and ST152.

The step ST3118 follows the step ST118. The step ST3118 determines whether or not the present engine speed Ne is lower than a prescribed engine speed Ne_o being a reference for idle of a prime mover 1 (see FIG. 1). When the present engine speed Ne is lower than the prescribed engine speed Ne_o, the program advances from the step ST3118 to the step ST3150. On the other hand, when the present engine speed Ne is equal to or higher than the prescribed engine speed Ne_o, the program advances from the step ST3118 to the step ST150.

The step ST3150 sets the command torque Tmgcom of an electric generator/motor 2 (see FIG. 1) to the engine torque up quantity ΔTe.

The step ST3152 follows the step ST3150. The step ST3152 sets the power-generation execution term Ton to the predetermined PWM period Tinter. After the step ST3152, the program advances to the step ST126.

The step ST150 is followed by the step ST152. After the step ST152, the program advances to the step ST126.

In the case where the present engine speed Ne is lower than the prescribed engine speed Ne_o (for example, in the case where the prime mover 1 is idling), the command torque Tmgcom of the generator/motor 2 is set to the engine torque up quantity ΔTe by the step ST3150 and the power-generation execution term Ton is set to the predetermined PWM period Tinter by the step ST3152. Accordingly, in this case, the power-generation suspension term Toff is nullified, and the power generation by the generator/motor 2 is continuously executed. Therefore, it is possible to prevent the occurrence of the unstable rotation and the stalling of the prime mover 1 which might be caused by the intermittent execution of the power generation by the generator/motor 2.

Fourth Embodiment

A fourth embodiment of this invention is similar to the first embodiment thereof except for design changes mentioned hereafter.

Figure 9:
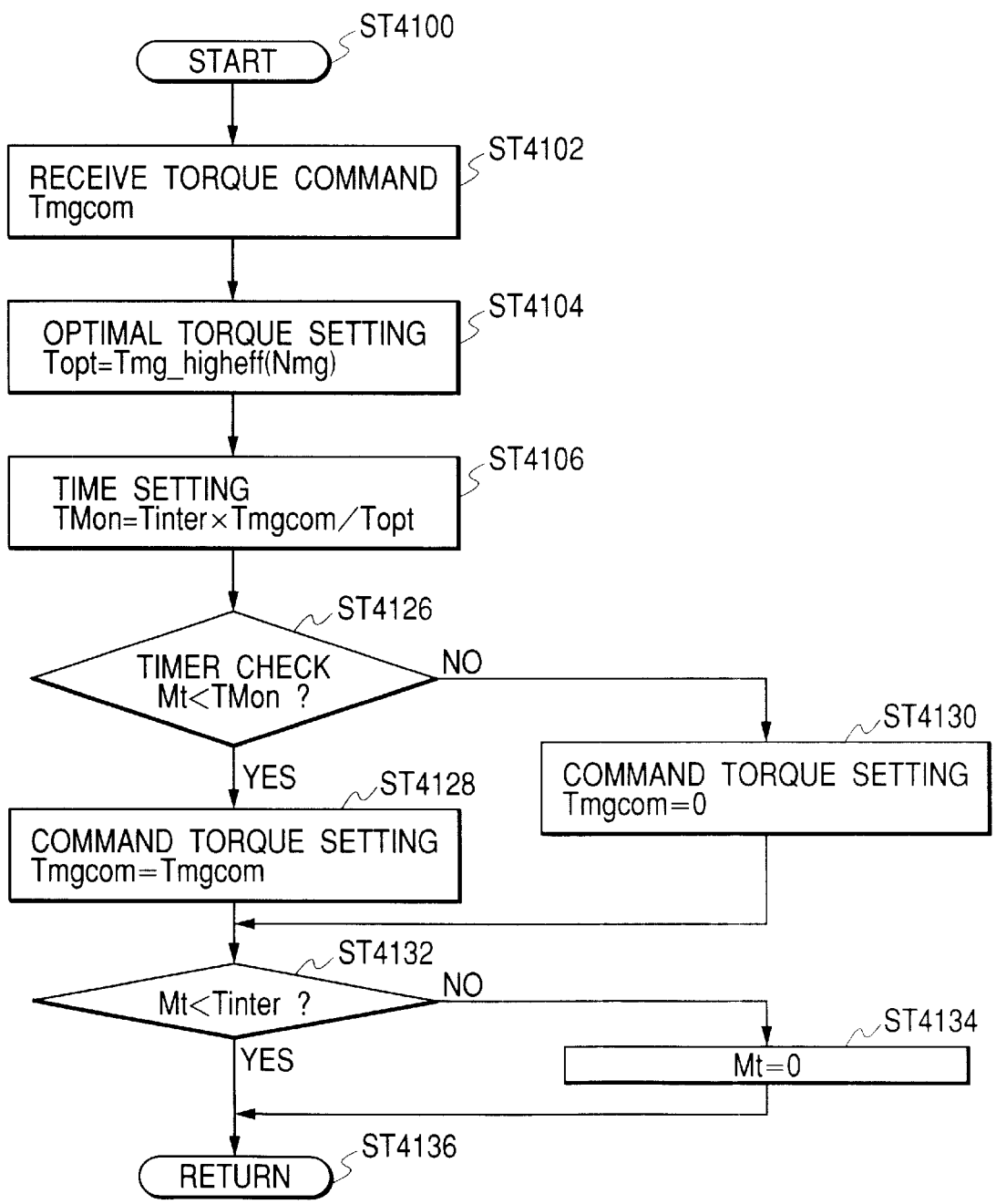
FIG. 9 is a flowchart of a segment of a program for a vehicle control unit in a fourth embodiment of this invention.

FIG. 9 is a flowchart of a segment of a program for a vehicle control unit 10 (see FIG. 1) in the fourth embodiment of this invention. The program segment in FIG. 9 relates to the operation of an electric generator/motor 2 (see FIG. 1) in a motor mode. The program segment in FIG. 9 is repetitively executed.

With reference to FIG. 9, a starting step ST4100 of the program segment resets or initializes specified variables and flags used during the execution of the program segment.

A step ST4102 following the step ST4100 gets or receives information representing a command torque Tmgcom of the generator/motor 2 operated in the motor mode.

A step ST4104 subsequent to the step ST4102 derives the present rotational speed Nmg of the shaft or the rotor 21 of the generator/motor 2 from the information given by an inverter control unit 7 (see FIG. 1). The step ST4104 calculates a highest-efficiency torque Tmg_higheff(Nmg) of the generator/motor 2 from the present generator/motor speed Nmg according to a table look-up procedure or a predetermined function. The highest-efficiency torque Tmg_higheff(Nmg) corresponds to a value at which the efficiency of the generator/motor 2 operated in the motor mode is maximized. The step ST4104 sets an optimal torque Topt of the generator/motor 2 to the highest-efficiency torque Tmg_higheff(Nmg).

A step ST4106 following the step ST4104 calculates a motor activation term TMon from the predetermined PWM (pulse-width modulation) period Tinter, the command torque Tmgcom of the generator/motor 2, and the optimal torque Topt thereof according to an equation as follows.

$$TMon = Tinter \cdot Tmgcom/Topt$$

The motor activation term TMon means a time interval during which the generator/motor 2 continues to be operated in the motor mode. There is a motor deactivation term TMoff during which the motor mode of operation of the generator/motor 2 remains suspended. In general, the motor activation term TMon and the motor deactivation term TMoff alternate with each other. The predetermined PWM period Tinter is composed of a pair of the motor activation term TMon and the motor deactivation term TMoff.

A step ST4126 refers to a motor-activation timer (a variable). According to a timer control subroutine of the program, the motor-activation timer is started when the motor mode of operation of the generator/motor 2 is commenced. The motor-activation timer measures the time interval "Mt" during which the motor mode of operation of the generator/motor 2 continues, that is, the time elapsed since the moment of the commencement of the motor mode of operation. The step ST4126 determines whether or not the measured time interval "Mt" reaches the motor activation term TMon. When the measured time interval "Mt" does not reach the motor activation term TMon, the program advances from the step ST4126 to a step ST4128. On the other hand, when the measured time interval "Mt" reaches the motor activation term TMon, the program advances from the step ST4126 to a step ST4130.

The step ST4128 holds the command torque Tmgcom of the generator/motor 2 unchanged. Specifically, the step ST4128 executes the program statement "Tmgcom= Tmgcom". According to a generator/motor control subroutine of the program, the motor mode of operation of the generator/motor 2 is implemented and controlled so as to substantially equalize an actual output torque thereof to the command torque Tmgcom. After the step ST4128, the program advances to a step ST4132.

The step ST4130 resets the command torque Tmgcom of the generator/motor 2 to "0". Specifically, the step ST4130 executes the program statement "Tmgcom=0". According to the generator/motor control subroutine of the program, the motor mode of operation of the generator/motor 2 is suspended in response to the command torque Tmgcom being "0". As a result, the motor activation term TMon is replaced by the motor deactivation term TMoff. After the step ST4130, the program advances to the step ST4132.

The step ST4132 determines whether or not the measured time interval "Mt" reaches the predetermined PWM period Tinter. When the measured time interval "Mt" reaches the predetermined PWM period Tinter, the program advances from the step ST4132 to a step ST4134. On the other hand, when the measured time interval "Mt" does not reach the predetermined PWM period Tinter, the program advances from the step ST4132 to an ending step ST4136. In this case, the current execution cycle of the program segment ends, and then the program returns to a main routine.

The step ST4134 resets the motor activation timer, and thereby initializes the measured time interval "Mt" to "0". After the step ST4134, the program advances to the ending step ST4136 at which the current execution cycle of the program segment ends. Then, the program returns to the main routine.

Under given conditions, the program segment in FIG. 9 commands the generator/motor 2 to be intermittently operated in the motor mode at the predetermined PWM period Tinter and the duty cycle (the duty ratio) determined by the length of the motor activation term TMon. As a result, the generator/motor 2 actually implements the motor mode of operation on an intermittence basis. The motor activation term TMon (or the duty ratio) is set so as to substantially equalize a mean actual output torque of the generator/motor 2 to the command torque Tmgcom thereof.

Fifth Embodiment

A fifth embodiment of this invention is similar to one of the first to fourth embodiments thereof except that the generator/motor 2 is located instead of a conventional alternator.

Sixth Embodiment

A sixth embodiment of this invention is similar to one of the first to fifth embodiments thereof except that the engine output torque is adjusted by controlling the throttle position and also by a modulated displacement procedure. According to the modulated displacement procedure, the number of active cylinders in the prime mover 1 is reduced. For example, in the case where the prime mover 1 is a 12-cylinder engine, the number of active cylinders is reduced from 12 to 6.

What is claimed is:

1. An electric-power generating apparatus for an automotive vehicle with a hybrid drive including a prime mover, the apparatus comprising:

an electric device operating as either a generator or a motor, and being connected with the prime mover for transmitting and receiving torque to and from the prime mover;

means for determining a required power generation quantity; and a control unit for, in cases where the electric device is required to operate as the generator, alternately setting a power-generation execution term and a power-generation suspension term and for controlling the electric device to intermittently operate as the generator so as to substantially equalize a mean quantity of actual power generation by the electric device to the required power generation quantity, wherein during the power-generation execution term, the electric device operates as the generator and provides a power generation quantity greater than the mean quantity, and during the power-generation suspension term, operation of the electric device as the generator is suspended, wherein said power-generation execution term and said power-generation suspension term define a duty cycle for respectively enabling and disabling the generator and a sum of the power-generation execution term and the power-generation suspension term is equal to 1 second or shorter.

2. An electric-power generating apparatus as recited in claim 1, wherein the control unit comprises means for setting the electric device to a highly efficient state during the power-generation execution term, and means for adjusting a ratio between the power-generation execution term and the power-generation suspension term so as to substantially equalize the mean quantity of actual power generation to the required power generation quantity.

3. An electric-power generating apparatus as recited in claim 1, wherein the control unit comprises means for changing a torque of the prime mover in response to which of the power-generation execution term and the power-generation suspension term is currently set.

4. An electric-power generating apparatus as recited in claim 1, further comprising means for gradually varying a command torque of the electric device.

5. An electric-power generating apparatus as recited in claim 1, wherein the prime mover and the electric device are connected via a transmission to vehicle wheels, and the electric device is connected with a battery, and wherein the control unit comprises means for detecting a required charge quantity of the battery and setting the detected required charge quantity as the required power generation quantity, and means for changing a gear ratio in the transmission in response to the required power generation quantity.

6. An electric-power generating apparatus as recited in claim 1, further comprising means for detecting a rotation speed of the prime mover, means for determining whether or not the detected rotational speed of the prime mover is lower than a prescribed reference speed, and means for nullifying the power-generation suspension term to continuously set the power-generation execution term in cases where it is determined that the detected rotational speed of the prime mover is lower than the prescribed reference speed.

7. An electric-power generating apparatus as recited in claim 1, wherein the control unit comprises means for, in cases where the electric device is required to operate as the motor, alternately setting a motor activation term and a motor deactivation term and thereby controlling the electric device to intermittently operate as the motor, wherein during the motor activation term, the electric device operates as the motor, and during the motor deactivation term, operation of the electric device as the motor is suspended.

8. An electric-power generating apparatus as recited in claim 1, further comprising means for detecting a rotation speed of the prime mover, means for calculating a maximum power generation quantity from the detected rotational speed of the prime mover, means for determining whether or not the required power generation quantity is greater than the maximum power generation quantity, and means for, in cases where it is determined that the required power generation quantity is greater than the maximum power generation quantity, correcting and equalizing the required power generation quantity to the maximum power generation quantity.

9. An electric-power generating apparatus as recited in claim 1, further comprising means for detecting a rotation speed of the prime mover, means for deciding a prime-mover torque up quantity in response to the required power generation quantity, means for determining whether or not the prime-mover torque up quantity can be provided at a current value of the detected rotational speed of the prime mover, and means for, in cases where it is determined that the prime-mover torque up quantity can not be provided, updating the required power generation quantity in response to the prime-mover torque up quantity and the current value of the detected rotational speed of the prime mover.

10. An electric-power generating apparatus as recited in claim 1, further comprising means for, in cases where the electric device is operating as the generator, comparing a generator mean torque command value and a highly efficient operation point torque of the generator to select the greater of the generator mean torque command value and the highly efficient operation point torque of the generator, and means for controlling the generator in response to the greater of the generator mean torque command value and the highly efficient operation point torque of the generator.

11. An electric-power generating apparatus for an automotive vehicle with a hybrid drive including a prime mover, the apparatus comprising:

an electric device operating as either a generator or a motor, and being connected with the prime mover for transmitting and receiving torque to and from the prime mover;

first means for determining whether or not the electric device is required to operate as the generator; and second means for controlling the electric device to intermittently operate as the generator according to a duty cycle comprised of an on time and an off time, a sum of the on time and the off time being equal or less than 1 second, in cases where the first means determines that the electric device is required to operate as the generator.

12. An electric-power generating apparatus for an automotive vehicle with a hybrid drive including a prime mover, the apparatus comprising:

an electric device operating as either a generator or a motor, and being connected with the prime mover for transmitting and receiving torque to and from the prime mover;

first means for determining whether or not the electric device is required to operate as the motor; and second means for controlling the electric device to intermittently operate as the motor according to a duty cycle comprised of an on time and an off time, a sum of the on time and the off time being equal or less than 1 second, in cases where the first means determines that the electric device is required to operate as the motor.

13. An electric-power generating apparatus for an automotive vehicle with a hybrid drive including a prime mover, the apparatus comprising:

an electric device operating as either a generator or a motor, and being connected with the prime mover for transmitting and receiving torque to and from the prime mover;

first means for determining a required power generation rate; second means for determining whether or not the electric device is required to operate as the generator; and third means for controlling the electric device to intermittently operate as the generator according to a duty cycle comprised of an on time and an off time, a sum of the on time and the off time being equal or less than 1 second, so as to substantially equalize a mean rate of actual power generation by the electric device to the required power generation rate in cases where the second means determines that the electric device is required to operate as the generator.

* * * * *